United States Patent [19]

Thacker

[11] Patent Number: 5,267,235

[45] Date of Patent: Nov. 30, 1993

[54] METHOD AND APPARATUS FOR RESOURCE ARBITRATION

[75] Inventor: Charles P. Thacker, Palo Alto, Calif.

[73] Assignee: Digital Equipment Corporation, Maynard, Mass.

[21] Appl. No.: 887,176

[22] Filed: May 21, 1992

[51] Int. Cl.$^5$ .............................................. H04Q 11/04
[52] U.S. Cl. ...................................... 370/60; 370/85.8; 340/825.07
[58] Field of Search ................. 370/60, 94.1, 61, 60.1, 370/63, 54, 85.8; 340/825.07, 825.08

[56] References Cited

U.S. PATENT DOCUMENTS

| | | |
|---|---|---|
| 3,916,380 | 10/1975 | Fletcher et al. . |
| 4,439,826 | 3/1984 | Lawrence et al. . |
| 4,603,416 | 7/1986 | Servel . |
| 4,630,260 | 12/1986 | Toy et al. . |
| 4,656,622 | 4/1987 | Lea . |
| 4,866,702 | 9/1989 | Shimizu et al. . |
| 4,937,817 | 6/1990 | Lin . |
| 4,947,390 | 8/1990 | Sheehy . |
| 5,091,905 | 2/1992 | Amada ........................ 370/60 |
| 5,124,978 | 6/1992 | Chao ........................... 370/60 |
| 5,126,999 | 6/1992 | Munter et al. ................ 370/60 |
| 5,130,975 | 7/1992 | Akata .......................... 370/60 |

Primary Examiner—Douglas W. Olms
Assistant Examiner—Ajit Patel
Attorney, Agent, or Firm—Flehr, Hohbach, Test, Albritton & Herbert

[57] ABSTRACT

The present invention provides a rapid one-to-one match between requesters that must arbitrate for service from one of a number of servers. Each requester presents a set of requests, and the requesters are indifferent to which server is chosen, no priority existing among the requests seen by a particular server. Requests are presented synchronously to all servers to which access is desired. Each server selects precisely one such request, preferably randomly, and asserts a response signal so stating to all requesters. Each requester then selects precisely one incoming grant responses (if any there are), and de-asserts requests to all other servers. This iteration is repeated for a predetermined number of cycles, at which time substantially most of the requested matches will have been made. The iteration algorithm is preferably implemented with choice units, multiplexers, registers and logic units, all of which may be obtained commercially.

26 Claims, 6 Drawing Sheets

METHOD AND APPARATUS FOR RESOURCE ARBITRATION

The present invention relates generally to systems whose resources include contending requesters and servers, and more particularly to a method and apparatus for arbitrating suitable matches between such requesters and servers.

BACKGROUND OF THE INVENTION

In many information processing systems having a number of system resources, often called servers, the situation frequently arises wherein a set of requesters must arbitrate for service from one of a number of servers. For instance, in a data packet switching application, the requesters may each need to transmit one or more cells (i.e., small packets of information) to various ones of the servers. Each requester receives cells from one or more system users (e.g., components) that need to be forwarded to specified ones of the servers. If the requester has at least one cell that needs to be forwarded to a server, then the requester will generate a request for access. The problem is to rapidly produce a set of one-to-one matchings that maximizes the number of connections between requesters and servers. Preferably the matchings should be produced without imposing significant overhead on the system.

Switching (i.e., connecting requesters to servers, or transmitting data from senders to receivers) involves two separate tasks. First, a scheduling task is performed, wherein an arbitration mechanism selects which of potentially many requests to send to each server. Second, a data forwarding task is performed, in which a switching mechanism forwards requests or cells to servers in accordance with the selections made by the scheduling task.

Such an arbitration mechanism may be needed in contexts other than data packet switching. For instance, a computer system may have multiple processors that must be matched (or selectively coupled) to multiple storage units ("servers"). The requesters generate access requests to ones of the storage units, which requests are presented to an arbitration mechanism. The arbitration mechanism first selects which requests to grant, and then an interconnection or switching mechanism couples the selected processors to the requested storage units.

Figure 1:
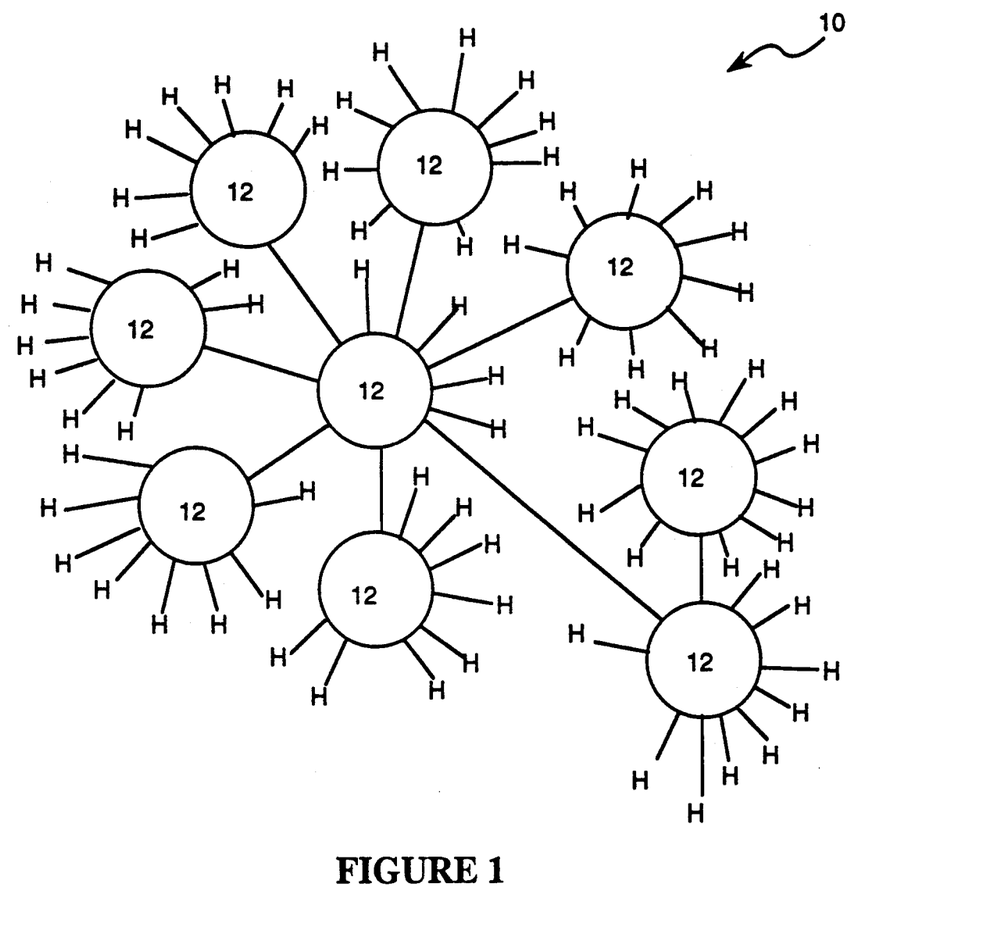
FIG. 1 schematically represents a point-to-point communication network.

Although the subsequent material herein describes a local area switching network, the present invention may be applied in any application in which a rapid matching of requestors and servers is needed. Referring to FIG. 1, in a point-to-point communications network 10, the network has a number of switches 12 each of which is connected to other switches and/or a number of hosts (H), such as workstations. Each switch 12 has multiple input ports through which "requesters" generate requests, and multiple output ports or "servers". Cells of data are presented to the input ports of the switch via link circuitry. Each input port receives, and stores in an input buffer, a set of cells, with each cell member bearing an address that identifies an output port to which the cell requests routing. The arbitration mechanism now must satisfy not one request, but a set of requests. This is a relatively difficult and time consuming task because many arbitration matches are possible between cells in the input port sets and the output ports. Some matches will be better than others, and the problem is to rapidly find a good match satisfying the largest number of contending requests.

Ideally, the arbitration mechanism will rapidly provide a "maximum match", a match having the property that no other arrangement between input ports and output ports would make more requester-server connections possible. Unfortunately assuring and achieving a maximum match within a relatively short number of clock cycles is computationally very difficult and is not necessarily feasible in a practical application.

A less ideal but more realizable solution is for the arbitration mechanism to provide a "maximal match", a match having the property that once matching is complete no additional connections ports can be made. However in a maximal match, if it were permissible to subsequently rearrange connections and priorities, additional connections might in fact be possible.

The present invention is an arbitration mechanism and procedure that provides maximal matching within a relatively small number of clock cycles. Fast matching is important so that the arbitration procedure can be repeated quickly for successive sets of requests. In particular, the arbitration procedure for one set of requests should be no longer than the amount of time needed to transmit the requests granted during the previous arbitration cycle. When the requests are small cells that are transmitted in just a few clock cycles, the arbitration mechanism has only a similar number of clock cycles to arbitrate competing requests. The arbitration mechanism of the present invention can be implemented using presently existing circuit components.

SUMMARY OF THE INVENTION

In a system having multiple requesters desiring access to multiple servers, it is the function of the present invention to arbitrate the contending requests and to rapidly provide a maximal one-to-one match between the requesters and servers. The present invention is an arbitration apparatus that implements a randomized parallel iterative method to determine matchings between requesters and servers.

The arbitration apparatus of the present invention receives and stores for each requester a set of requests for access to specified ones of the various servers. Preferably the requesters are indifferent to which server might be selected for access, and there is no priority among the contending request set members as seen by a particular server. According to the present invention, each requester can be coupled to no more than one server at any one time. The resultant one-to-one matching is rapidly achieved without imposing excessive overhead on requesters and servers.

The method for arbitrating contending requests according to the present invention involves the following steps:

(1) In a request phase, the access requests by all the requesters are synchronously communicated, or asserted, in parallel to each server requested.

(2) In a grant phase, each server simultaneously examines all access requests directed to R, and selects precisely one such request, to whose requester a grant is issued. Each server then communicates this grant assertion to the requester seeking access to that server. Preferably the grant selection is random or at least pseudo-random to promote convergence of the selection algorithm, the most important criterion being that but one request is granted.

(3) In an acceptance phase, each requester simultaneously examines all grants sent to it by the servers, and selects precisely one such grant, the selection not necessarily being random or pseudo-random. Note that one requester may receive several grants while another requester may receive no grants.

(4) If a requester's access request was granted by a requested server and that grant was accepted by the requester, a one-to-one connection will be made between the requester and the server, thus satisfying the requester's request. On the average, the present invention will match about 75% of the requesters with a server on each "request-grant-select" iteration.

(5) The "request-grant-accept" iteration of steps (1)-(4) is then repeated for all requesters which did not receive at least one grant during a previous iteration. In this fashion the present invention iterates to service unsatisfied requesters that remain after the first iteration.

(6) After a predetermined number of iterations, four for example, the request-server matches are communicated to a switching mechanism, completing one arbitration cycle. The switching mechanism connects the matched requesters and servers and performs the associated data transfer during the next cycle. Furthermore, during the next arbitration cycle a new set of access requests are presented and the arbitration iteration process begins anew.

A preferred implementation of the above-described algorithm is presented, wherein the system includes a switching mechanism having a plurality of input and output ports, for connecting requested output ports (or servers) to requesting input ports (or requesters). As used herein, input ports are the mechanism through which generated access requests pass, and servers are the mechanism through which access to some system resource is sought. For each input port an arbitration mechanism according to the present invention provides an input unit, and for each output port, the arbitration mechanism provides an output unit. The arbitration mechanism also provides connections between every input unit and every output unit.

Preferably for each switching mechanism input port, the present invention provides an input port buffer, an input unit that includes a grant selector, and a latchable request register that stores a set of outstanding access requests. In practice, the various input port buffers associated with each switching mechanism input port may already exist in the system with which the present invention is practiced.

For each input port, the system causes a bit pattern to be loaded into the input port buffer, which pattern represents a set of requests for access to specified ones of the output ports. In a first "request phase", these requests are loaded from the associated input port buffer into the latchable request register, and are synchronously provided in parallel to every output unit in the arbitration mechanism. The synchronous and parallel communicating of the requests occurs via the connections between all input and output units, and allows every output unit to know what access requests are being asserted to an associated output port.

For each switching mechanism output port, the present invention provides an output unit that includes an access selector and a latching grant register. Synchronously and in parallel, the access selectors each receive zero to N requests for access to the output port associated with the access selector's output unit. In a first "grant phase" the access selector selects precisely one request to grant. Preferably this grant selection is random, or at least pseudo-random, the most important criterion being that but one request is granted.

Each input unit can receive anywhere from zero to N access grants from output units responding to an access request from a requester associated with the input port for which the input unit is provided. Each input unit's grant selector receives these grant assertions and selects precisely one grant (if any there are). This selection is not required to be random or pseudo-random.

In the preferred embodiment, the grant selector's choice is then loaded into the associated request register. Thus, this register will now hold information identifying the one access request that the arbitration mechanism selected and granted for the input port for which the register's input unit has been provided.

The latching grant register in each output unit is loaded with information indicating the input port to which a grant signal was sent. If that grant signal is selected by the corresponding input unit, the grant register retains the same grant information until the entire arbitration cycle is completed, and the output unit continuously provides (until otherwise reset) a grant signal to the input port whose access request has been granted and selected.

The above-described "request-grant-select" phases define a first iteration cycle for the arbitration mechanism. After this first cycle some requesters at the switching mechanism input ports will have been matches with servers at the switching mechanism output ports, and other requests for access will still be outstanding. On the average, the present invention will make about 75% of the requesters are matched with a server on each "request-grant-select" iteration. The remaining unsatisfied requests are subject to further treatment by the arbitration mechanism during further iterative cycles. After the arbitration mechanism performs a predefined number of iterative cycles, for each satisfied request, a one-to-one connection is made between the matched switching mechanism input port and output port.

Because each input port is coupled to at most one output port, and each output port is coupled to at most one input port, parallel operation and rapid arbitration is thus possible. The arbitration mechanism is typically permitted to operate on the same input port buffer data for a relatively small number of iteration cycles, e.g., four, after which new data are loaded into the input buffers, whereupon the arbitration mechanism begins anew.

Other features and advantages of the invention will appear from the following description in which the preferred embodiments have been set forth in detail in conjunction with the accompanying drawings.

DETAILED DESCRIPTION OF THE PREFERRED EMBODIMENTS

Referring to FIG. 1, in some communication networks packets are fragmented into smaller cells for transmission over the network. Furthermore, the cells of different packets (e.g., packets simultaneously arriving at a particular host computer or switch from different nodes in the network) may be interleaved on the same network transmission medium. An example of such a network is an Asynchronous Transfer Mode (ATM) network. In ATM networks, packets are transmitted in the form of cells, each of which is 53 bytes long, including a five byte header and a 48-byte data portion. In most such networks, there is an upper bound on the size of any one packet, which may be many times the size of a single cell. However, there is no upper bound on the number of packets interleaved on any one network link. It is for this reason that the input port of a switch may receive a sequence of cells that need access to different ones of the switch's output ports.

Figure 2:
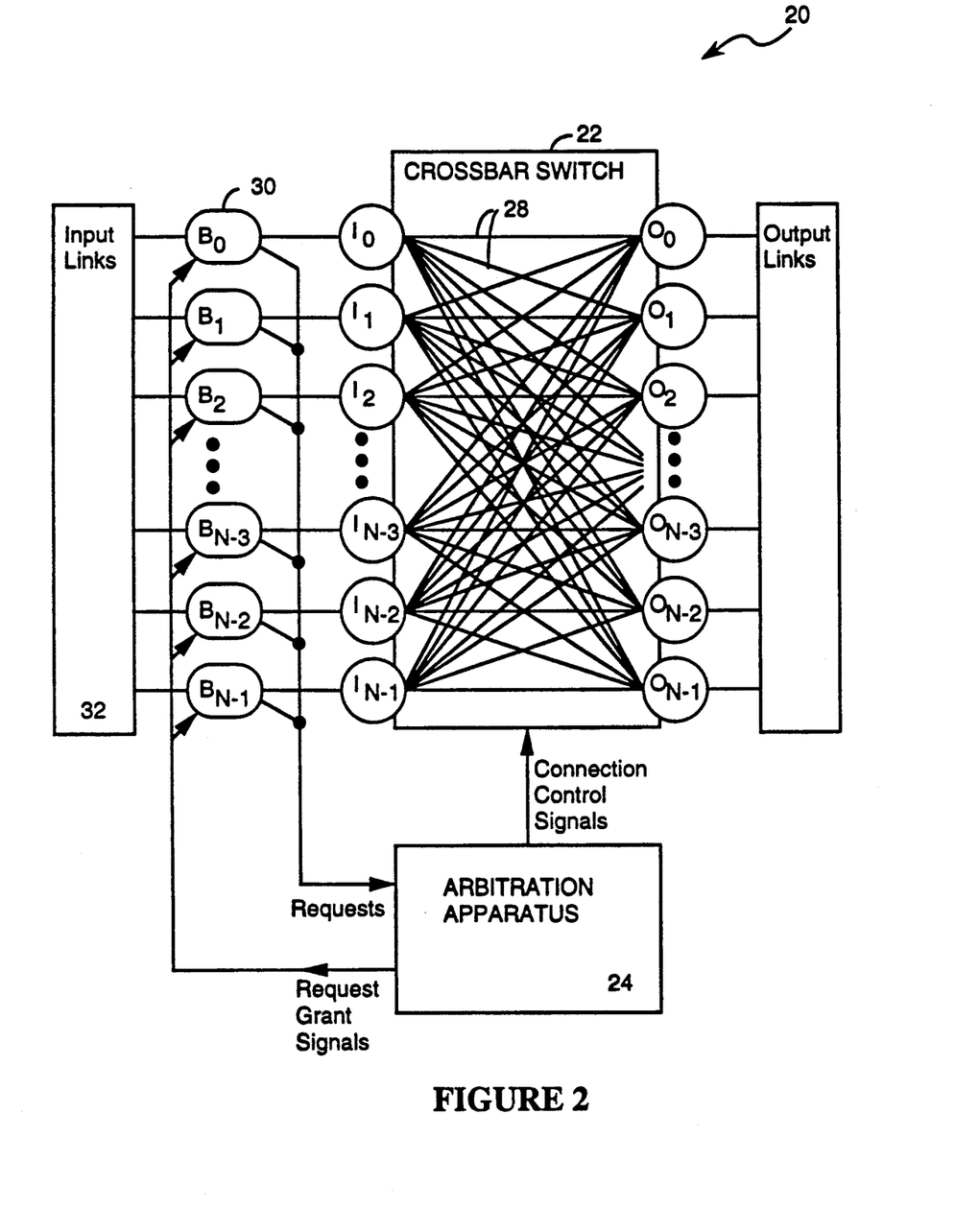
FIG. 2 is a conceptual representation of a resource arbitration system according to the present invention.

FIG. 2 depicts a request arbitration and switching system 20 whose resources include N requesters denoted $I_0, I_1 \ldots I_{N-1}$, and N servers denoted $O_0, O_2 \ldots O_{N-1}$. Typically a switching mechanism 22, such as a crossbar switch, is provided to implement the connections between requesters and servers. In the presently preferred embodiment of FIG. 2, switching mechanism 22 has N input ports, each of which may be considered to represent a requester $I_i$, and N output ports, each of which may be considered to represent a server $O_j$, where $0 \leq i \leq N-1$ and $0 \leq j \leq N-1$. The system 20 also includes an arbitration mechanism 24, according to the present invention, for determining what connections to make between requesters and servers (or input ports and output ports in the preferred embodiment). As indicated by paths 28, the switching mechanism 22 can couple every input port to every output port and every output port to every input port, i.e., every requester to and from every server.

In the arbitration apparatus 24, for each path 28 in the switching mechanism 22 there are two paths, a "request" path from input port to output port, and a "grant" path from each output port to each input port. Thus, where the switching mechanism has N ports, there will be $N^2$ request paths and $N^2$ grant paths in the arbitration apparatus, for a total of $2N^2$ paths.

Each input port $I_i$ has an associated input port buffer 30, labelled here $B_i$, that receives sets of cells from data input linkage circuitry 32. Preferably, cell movement within the system is synchronous and parallel such that the cell information arrives at the various input port buffers simultaneously. Each input port buffer contains N queues, each of which holds cells destined for a corresponding output port. As such, each input port buffer contains a set of queued requests for access to a set of output ports. One output port may thus be requested by more than one input port simultaneously. Cells remain in an input port buffer until they successfully request and achieve connection to a designated output port via the switching mechanism.

It should be noted that FIG. 2 is a functional or conceptual representation of the system 20. In fact, in the preferred hardware embodiment, the system is implemented using N circuit cards that are all plugged into a card cage. Each card contains one input unit and output unit, including the portions of the arbitration apparatus and switching apparatus associated with one input port and output port. The card cage has a back plane with all the required wires or connections for interconnecting each input unit to each output unit, and vice versa. While this hardware implementation scheme is useful because of its modularity, those skilled in the art will understand that the system could be implemented using other hardware organizational schemes.

Figure 3:
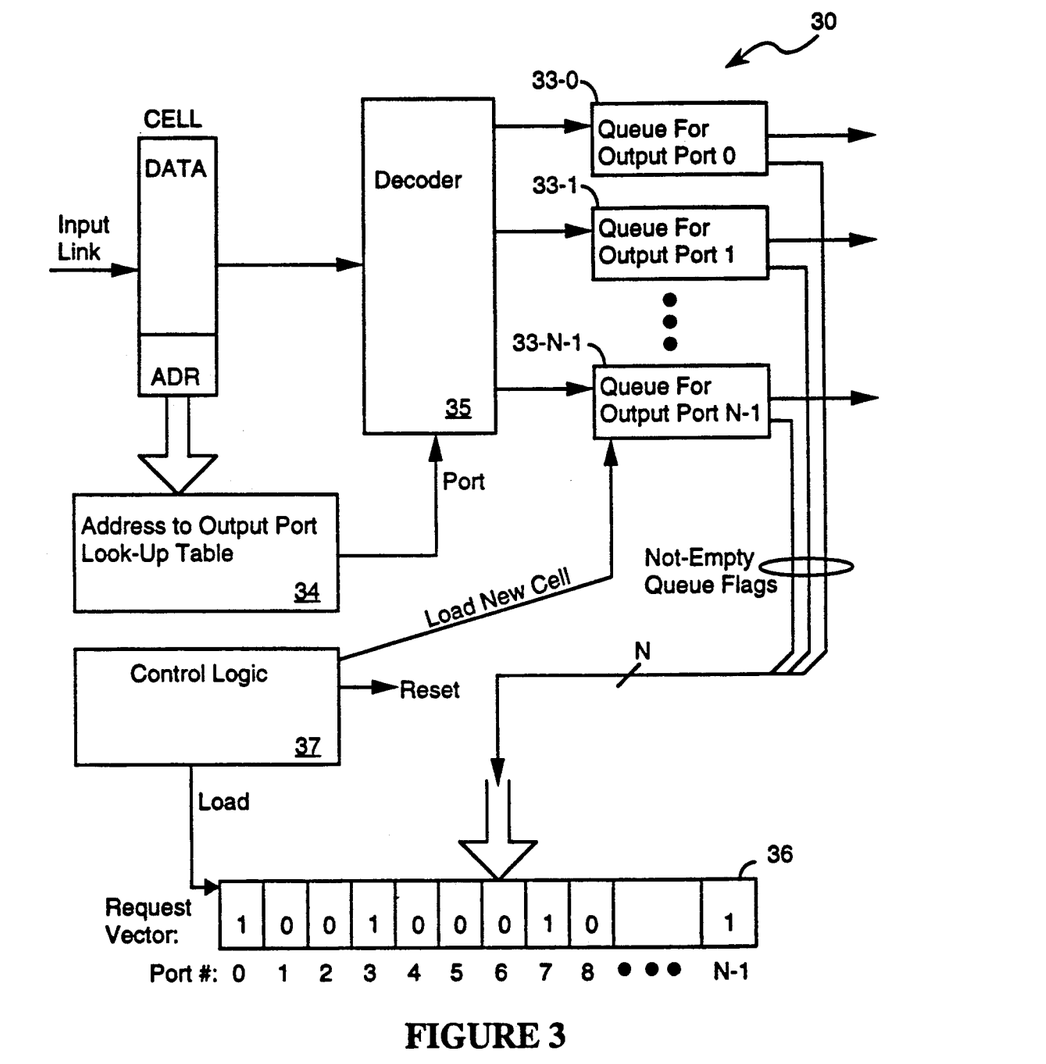
FIG. 3 depicts queued cells in an input buffer according to the present invention.

FIG. 3 depicts one input buffer 30 that receives cells, each of which is stored in one of N queues 33 (e.g., FIFO buffers) in accordance with the output port to which the cell will be transmitted. Within each queue 33, the cells are stored in the order received, and are delivered to the associated output port in that same order. Preferably each cell has a fixed length L, for example 53 bytes, comprising 5 address bytes (ADR) and 48 bytes of data (DATA). Of course the present invention may also be practiced with a system having variable length cells, using data structures well known to those skilled in the art.

In the preferred embodiment, the input linkage circuitry 32 presents cells to the input buffers $B_i$ with address bytes pertaining to a virtual circuit number associated with each cell. A look-up table 34 associated with each input buffer correlates the virtual circuit number required by a cell with the appropriate output port number $O_j$. For example, according to look-up table 34, access to virtual circuit 599 might require that the requesting cell be connected to output port 7. A decoder circuit 35 then routes the received cell to the corresponding holding queue 33.

Each holding queue 33-$i$ generates a one-bit "not-empty" flag signal that indicates whether or not the queue 33-$i$ is empty. If the queue 33-$i$ is not empty, meaning that it holds at least one cell, its non-empty flag signal is equal to "1", and if the queue 33-$i$ is empty its flag signal equals "0". These flag signals are stored at the beginning of each arbitration cycle in a request vector register 36, which contains a "bit map" indicating the output ports for which there are requests stored by the input port buffer. A "1" in a request vector means that access is requested to the output port (or server) corresponding to that bit in the request vector. In the example shown in FIG. 3, the left-most or 0th bit has a "1", as do bits 3 and 7. This vector 36 represents access requests directed to output ports 0, 3, and 7 (or more generally, to servers 0, 3 and 7). Multiple requests for a particular output port (such as output port 7) are represented by a single bit in the request vector. Thus, if multiple cells request the same output port, only one of those requests is communicated to the arbitration mechanism. Obviously, there are other ways of implementing access requests aside from using input buffers as described above.

Control logic 37 for the arbitration apparatus 24 generates signals that determine when new cells are to be loaded into the queues 33, when the request vector 36 is to be loaded, and generates other control signals such as the Reset signal for clearing the input and output registers in the arbitration apparatus at the beginning of each new arbitration cycle and signals for loading the input-output matches from each arbitration cycle into the switching apparatus.

In cooperation with the arbitration mechanism, the switching mechanism 22 must route the cells in each input port buffer to output ports specified by the address content of each cell. As such, a softable match between contending sets of input port requests and output ports must be made in a relatively short time. Because a maximum match is difficult to provide, especially within a relatively short time frame, the present invention provides a maximal match.

Figure 4:
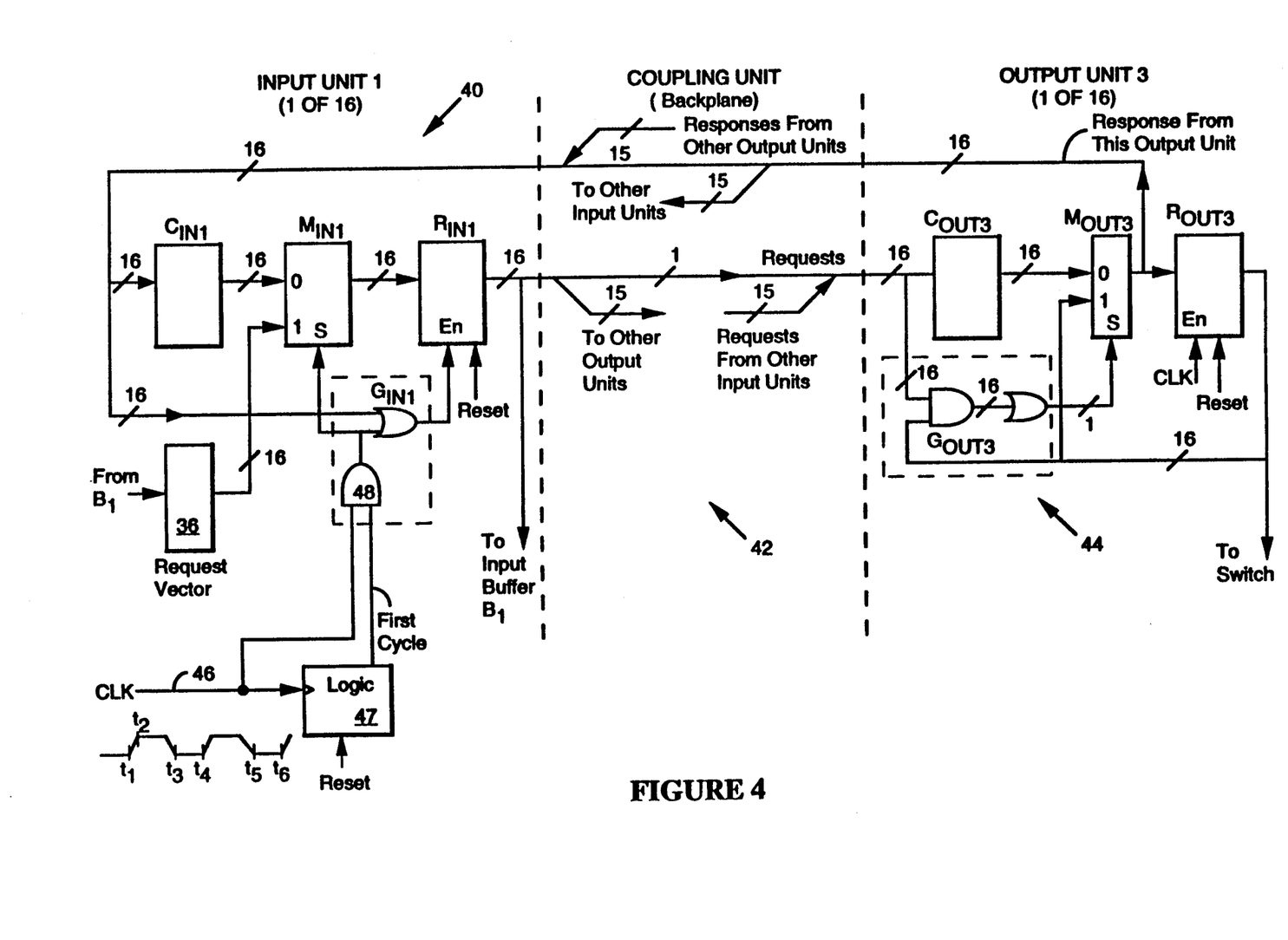
FIG. 4 depicts a preferred embodiment of an arbitration mechanism according to the present invention.

Operation of the present invention will now be described with reference to FIG. 4, FIG. 5 and FIG. 6. With reference to FIG. 4, a portion of a presently preferred embodiment of the arbitration mechanism 24 is depicted, corresponding to a single input port Ii (requester i) and a single output port $O_j$ (server j) within the switching mechanism 99. More specifically, input unit 1 (or $I_1$) and output unit 3 (or $O_3$) are depicted, which units are associated respectively with input port 1 (requester 1) and output port 3 (server 3). FIG. 4 also depicts the coupling connections between all input and output units. Note that, as indicated in the Figure, many of the connection lines drawn represent 15 or 16 parallel connections.

Preferably the arbitration mechanism includes N input units 40, a coupling unit 42, and N output units 44. It is to be understood that where the switching mechanism has N input and output ports (i.e., representing N requesters and N servers), what is depicted in FIG. 4 will be replicated -N times, with coupling connections being provided to and from all input and output ports. For the purposes of explaining the arbitration mechanism, a system with sixteen input and output ports will be used.

Each input unit 40 is coupled to an input buffer $B_i$ that is associated with input port $I_i$ (or requester i), from which h receives a request vector 36. The input unit 40 includes an input multiplexer $M_{INi}$, a clocked input register $R_{INi}$, an input choice unit $C_{INi}$, and an OR gate $G_{INi}$, having N+1 inputs. Thus with reference to input unit 3 in FIG. 4, since input port 1 (or requester 1) is depicted, i=1.

The coupling unit 42 contains wires connecting each input unit 40 port to each output unit 44 of the arbitration mechanism 24. Where the switching mechanism 22 contains N input and output ports, there will be $2N^2$ coupling wires. In the preferred embodiment, N=16, and $2N^2$ or 512 traces are located on the backplane of the card cage containing each input and output unit.

Each output unit 44 includes an output multiplexer $M_{OUTj}$, a clocked output register $R_{OUTj}$, an output choice unit $C_{OUTj}$ and logic unit $G_{OUTj}$. Each output unit 44 is associated with an output port (or server), and with reference to FIG. 4, since output unit 3 is depicted, j=3.

As noted, preferably the system 20 causes cells to be presented to each input port buffer $B_i$ synchronously, with each cell requesting access to a specific output port or server. Because the coupling unit 42 interconnects all the input and output units, every output unit 44 is made immediately aware of every request for access by a queued cell.

Figure 5:
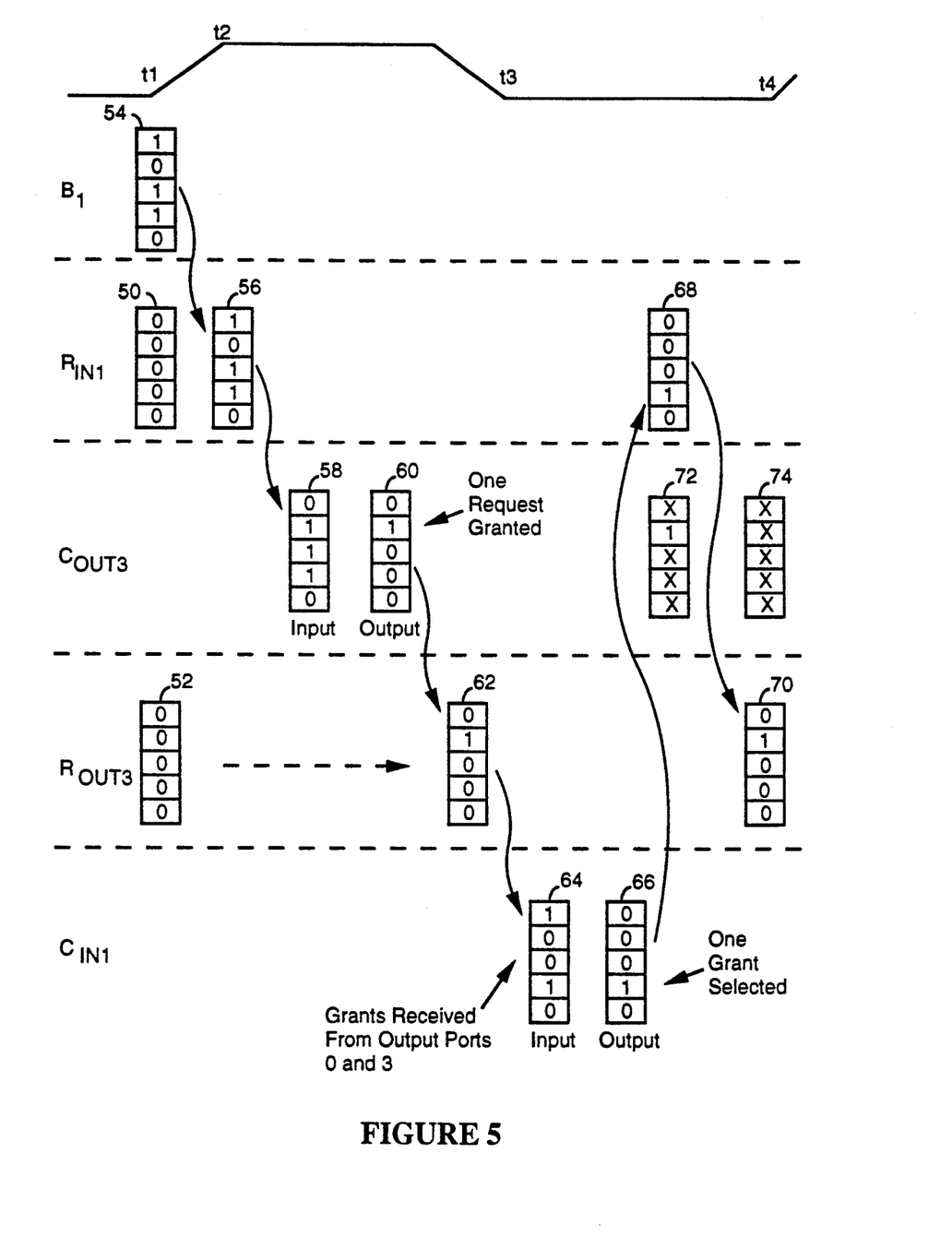
FIG. 5 depicts register and choice unit contents for the input and output units depicted in FIG. 4.

With reference to FIG. 4 and FIG. 5, the contents of all registers including registers $R_{IN1}$, $R_{OUT3}$ are set to zeroes at the beginning of a first iteration sequence at time $t_1$ (shown as the Reset signal in FIG. 4). In the presently preferred embodiment of FIG. 4, at time $t_1$ a process clock signal on line 46 preferably goes from "0" to "1". At time $t_1$ (and possibly prior thereto), each input unit's input buffer $B_i$ will hold a set of cells and will present to the input unit 40 a request vector 36. As described above, this request vector 36 consists of N bits. Bit k ($0 \leq k < N$) of the request vector contains a "1" if the queue of cells for output port k is not empty.

With reference to FIG. 5, elements 50 and 52 depict the initialization of registers $R_{IN1}$ and $R_{OUT3}$ to zeros, while element 54 depicts the contents of the request vector from buffer $B_1$ at time $t_1$. For ease of illustration in FIG. 5, the various buffers and registers will be depicted as being five (5) bits long (rather than N=16 or some larger number). It is understood that when N=5, a maximum of five access requests can be asserted by a single input port, as reflected by $B_1$ and $R_{IN1}$ each being depicted as having a capacity of five bits. With reference to FIG. 6, the system initialization and input buffer loading steps are depicted as boxes 100, 102 respectively. It is understood that the information depicted in the various registers in FIG. 5 may of course be implemented in other formats. For ease of illustration, it will be assumed that a "1" in a buffer position indicates that an access request is asserted for the output port (or output unit) that corresponds to that bit position. With reference to element 54 in FIG. 5, the input buffer $B_1$ in this example contains information that indicates system users are seeking access to output ports 0, 2 and 3. If, for example, all bit positions in $B_1$ were "0", then the associated input unit 1 would assert zero access requests to output units.

Preferably, within each input unit, the clock signal at line 46 is coupled to a logic unit (such as "OR" gate $G_{IN1}$ in FIG. 4) whose output enables the input unit's input register $R_{INi}$ when the clock signal is "1", e.g., at time $t_2$. Similarly the clock signal CLK is coupled to the select port ("S") of each input unit's multiplexer $M_{INi}$ during the first half of the first iterative request matching cycle. During subsequent iterative cycles logic circuit 47 and AND gate 48 cause the input multiplexer's select "S" port to receive a "0" signal. With reference to FIG. 4, when the signal at the multiplexer's select is "1", the multiplexer's output will be whatever signals are presented to the miltiplexer's "1" input. Similarly when S="0", the multiplexer output will be whatever signals are presented to the mditiplexer's "0" input.

Thus at time $t_2$, FIG. 4 shows input unit 1's multiplexer $M_{IN1}$ with S="1", which causes the contents of the request vector 36 from input buffer $B_1$ to pass from the "1" input of multiplexer $M_{IN1}$ to the multiplexer output to be presented as input data to register $R_{IN1}$. Since, as noted, R1 is "enabled" at time $t_2$, the contents of the request vector 36 upon passing through multiplexer $M_{IN1}$ are loaded into register $R_{IN1}$.

Note that multiplexer $M_{IN1}$ synchronously receives 16 (or N) parallel lines of input from the request vector 36, each line representing an access request from the associated input port buffer $B_1$. In FIG. 5, element 54 depicts the contents of the request vector 36 at the beginning of the first iterative step, at time $t_1$. Similarly element 56 shows that at time $t_2$ the contents of input register $R_{IN1}$ have gone from initial zeroes to replicating the contents of the request vector.

It is understood that what has just been described with reference to input unit 1 and output unit 3 applies to all input and output units. Thus at time $t_1$ the input and output registers in all input and output units are initialized to zeroes, and at time $t_2$ the contents of each input unit's request vector are transferred to the associated input register $R_{INi}$. Similarly, in the steps that will now be described with respect to input unit 1 and output unit 3 depicted in FIG. 4 are applicable to all input and output units of the arbitration apparatus. It is understood that $t_1$ and $t_2$ are preferably very close together in time. The $t_1$ to $t_2$ rise time in FIG. 5 is purposefully exaggerated for clarity in understanding the spatial relationship between register contents (compare for example elements 50 and 56 in FIG. 5).

At $t_2 \leq t \leq t_3$, the requests represented by the contents of request vector appear at the output of enabled register $R_{INi}$, and are transmitted in parallel to output unit 3 and to every other output unit. The inter-unit couplings occur via the card cage backplane traces herein called the coupling unit 42. According to the present invention, each of the N output units 44 may see a generated request for access from any of the input units 40. Of course if the request vector 36 from $B_i$ contains all "0's", then no access requests are asserted by the associated input port 1, and no access requests will be generated by input unit 1. Thus in FIG. 4, output unit 3 is shown as receiving one request signal from input unit 1, as well as one request signal from each of the other 15 input units. Any number, from 0 to N, of these request signals may be equal to "1" indicating an access request. In FIG. 6, box 104 depicts this step whereby the input unit (i.e., the requesters) assert an access request to a specific output port (or server).

Each output unit thus simultaneously receives between 0 and N access requests from the input units. As shown in FIG. 6, box 108, each output unit selects precisely one of the 0 to N incoming input requests to grant. With reference to FIG. 4, within each output unit, the 0 to N access requests are provided as inputs to an associated output choice unit $C_{OUTj}$. Each output choice unit selects at most one of the access requests, the selection preferably being random or at least pseudo-random.

Thus in FIG. 5, element 58 depicts the access requests from all the input units, presented as N inputs to output unit 3's output choice unit $C_{OUT3}$. Note that at this point these signals replicate one bit from each of the input unit registers $R_{INi}$. The "1" signals in element 58 indicated requests for use of output port 3 by the (first, third and fourth input ports. The implementation of choice units such as $C_{OUTj}$ that select one from N signals is known to those skilled in the relevant art. Circuitry and methods for implementing such choices may include, for example, random number generators. In particular, pseudo-random selection circuits are well known to those skilled in the art.

During $t_2 \leq t \leq t_3$, each output choice unit selects one of the access request inputs. FIG. 5, element 60 shows that output choice unit $C_{OUT3}$ selected for grant input unit 1's request to access output port 3 (e.g., server 3). This selection is apparent because all output positions in $C_{OUT3}$ are "0" except the position designating output port 3, corresponding to input unit 1. It is understood that had an access request not been directed to output port 3 by input unit 1, or directed but not selected by the output choice unit $C_{OUT3}$, then the bit position in element 60 for input port 1 would be a "0" rather than "1". Procedurally, the output unit selection of one incoming access request appears as box 106 in FIG. 6.

During $t_2 \leq t \leq t_3$, within each output unit, the output from the associated output choice selector $C_{OUTj}$ is coupled to the "0" input of the associated output multiplexer $M_{OUTj}$. Thus in FIG. 4, the output from $C_{OUT3}$ is coupled to the "0" input of multiplexer $M_{OUT3}$. It will be recalled that upon initialization all registers (including $R_{OUT3}$) were set to zeros, as shown by element 52 in FIG. 5. Furthermore, logic unit $G_{OUTj}$ logically ANDs each of the sixteen incoming request signals with corresponding ones of the grant signals stored in output register $R_{OUTj}$ (see element 62 in FIG. 5), and then logically ORs the results.

$G_{OUTj}$ outputs a select signal to multiplexer $M_{OUTj}$, and that select signal is equal to "1" only when there is a "1" grant signal in output register $R_{OUTj}$ that matches an asserted one of the incoming request signals. Thus logic unit $G_{OUT3}$ will initially output "0", which causes $M_{OUT3}$ to pass signals presented to the multiplexer "0" input. As a result, the selection made by output choice unit $C_{OUT3}$ passes through the multiplexer and into output register $R_{OUT3}$, which is enabled (because the clock signal has not yet transitioned low). Similarly in other output units, the access grant selection by each unit's output choice selector passes through the associated multiplexer and into the associated output register.

It is important to realize that output register $R_{OUT3}$ is latched at time $t_3$, and thereafter continuously holds its data, in this case representing selection of input port 1. The output vector from register $R_{OUT3}$ is presented to port "1" of the multiplexer $M_{OUT3}$ as well as to the associated logic unit $G_{OUT3}$, which outputs a "1" to the associated multiplexer selection port. As a result, multiplexer $M_{OUT3}$ will now pass the output from register $R_{OUT3}$, and ignore all signals from the choice unit $C_{OUT3}$ because the "0" multiplexer input is deselected by the S="1" signal. Further, during time period between $t_3$ and $t_4$ the output from the multiplexer $M_{OUT3}$, presenting the grant selection from output unit 3, is transmitted back to the input units. In similar fashion, all other output units will provide a response signal to all input units that identifies which (if any) access request has been selected and granted by that output unit. Procedurally, box 108 in FIG. 6 depicts the process step whereupon each output unit's access grant selection (if any) is latched and continuously communicated in parallel to all input ports.

Returning our attention to the input units, between $t_3 \leq t \leq t_4$, each input unit now receives 0 to N grant signals from the output units, which grants are coupled via the coupling unit 42 to the input of the various input choice units $C_{INi}$. Each grant signal presented to $C_{INi}$ specifies a requested output port that is willing to grant access to input port i. Element 64 in FIG. 5 shows, for example, that input unit 1 has received not only a grant from output unit 3 (associated with output port 3) but also a grant from output unit 0 (associated with output port 0). These grants are recognized by the "1" in the zero and third positions of $C_{IN1}$. Comparing elements 64 and 54 in FIG. 5, we see that input unit 1 also requested access to output unit 2, which access has not been granted.

Figure 6:
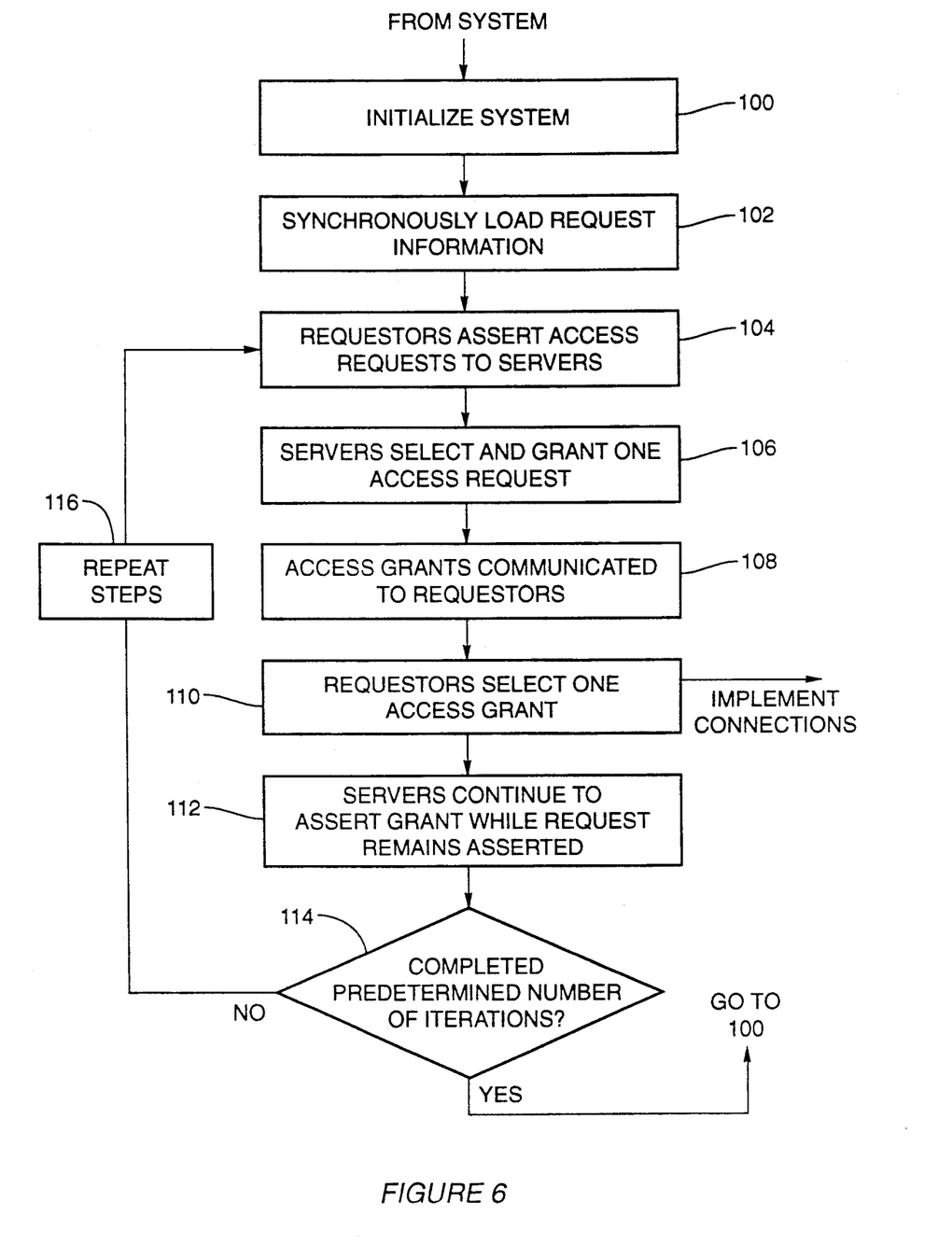
FIG. 6 is a flow chart depicting a method of arbitration according to the present invention.

According to the present invention, between time $t_3 \leq t \leq t_4$, each input choice unit $C_{INi}$ will select precisely one of the grants, the choice not necessarily being random or pseudo-random, this selection depicted as box 110 in FIG. 6. When an input unit 40 selects an access grant, a one-to-one connection is established between the matched input unit (or requester) and output unit (or server). This selection is depicted on the right-hand side of box 1 10 in FIG. 6. The implementation of the input choice units is relatively unimportant, providing each input choice unit selects but one incoming access grant. In one preferred embodiment, each $C_{INi}$ is implemented using simple linear priority selection techniques. For example, comparing elements 64 and 66 in FIG. 5, we see that $C_{IN1}$ has selected the access grant to output unit 3, as indicated by the "1" in the third position on the output of $C_{IN1}$. In an alternate embodiment, each input choice unit is implemented as a rotating priority selection circuit, which are also known to those skilled in the art.

In the embodiment of FIG. 4, at time $t \geq t_3$, the clock signal on line 46 goes from "1" to "0", causing a "0" select signal ("S") to be applied to the each input multiplexer $M_{INi}$. However the input logic $G_{INi}$ outputs a "1" if any grant signals were received, and therefore continues to enable input register $R_{INi}$. Thus, for each input unit which received at least one grant signal, the input register now loads the output of $C_{INi}$, namely information identifying the one output unit whose grant of access has been selected by the input choice unit. For input units which received no grant signals, the input logic $G_{INi}$ outputs a "0", in which case the previous contents of the input register $R_{INi}$ (i.e., the request vector) are left unchanged.

Thus in FIG. 5, element 66 reflects that $C_{IN1}$ has selected the access grant from output unit 3, as evidenced by the "1" in the third position. Note that $C_{IN1}$ could have instead accepted a grant from output unit 0, but did not do so. Note, too, that element 68 shows the input register $R_{IN1}$ as now containing the same information as the output of the choice unit $C_{IN1}$.

As shown by FIG. 4, the output of $R_{IN1}$ identifying output unit 3 as the access grantor whose grant has been selected by input unit 1 is coupled synchronously and in parallel with the outputs of all the other input registers $R_{INi}$ to all output units during $t_3 \leq t \leq t_4$. In general, once an output choice unit $C_{OUTj}$ selects and grants an access request, the grant will continue to be asserted (i.e., a latched "1" remains on the relevant response line) for as long as the selected input unit continues to assert the request. (See box 112, FIG. 6). This is because the output logic $G_{OUTj}$ will output a "1" as long as the previously selected input request is matched by a request signal. As shown by element 70 in FIG. 5, the $R_{OUT3}$ register continues to hold the same grant vector as previously, because (in this example) the granted request was selected by input unit 1.

By the same token, input unit 1 will de-assert requests to all other output ports because all other lines leaving $R_{IN1}$ are "0" (see element 68 in FIG. 5). This de-assertion follows from the fact that, at most, each input unit can select precisely one of the access grants provided from the output units. If during a later iteration cycle an input unit rescinds its access request (because a different request was granted and selected), the corresponding output unit will select another request from another input unit (if any there are). Note in FIG. 5, element 72, that the input provided to output choice unit $C_{OUT3}$ will continue to be a "1" in the position denoting selected input unit 1, but may be "0" or "1" (indicated by an "X") in all other positions. The output of $C_{OUT3}$ is unimportant as indicated by all "X's" in element 74. This is because the latched "1" at the select ("S") input to $M_{OUT3}$ causes $M_{OUT3}$ to ignore the output of $C_{OUT3}$ at the "0" input and instead to pass the latched "1" at the multiplexer "1" input.

Thus by time $t_4$, an arbitration mechanism according to the present invention has matched the access request of input port 1 (or requester 1) to output port 3 (or server 3). During this same $t_1$ to $t_4$ time period, connections between other input ports and other output ports will in all probability also have been made. If an access request is granted and selected, the grant is satisfied and a one-to-one matching results between the associated input unit (requester) and output unit (server). On subsequent iterations, the matched input/output units remain connected together until new requester data is presented to the input port buffers $B_i$. Statistically, on average, the present invention will match approximately 75% of the access requests on an iteration cycle. In a presently preferred embodiment, the clock signal presented at line 46 (FIG. 4) has a 40 nanosecond cycle time, within which time approximately 75% of outstanding access requests are matched with servers.

The above process of "assert-select-grant" is repeated for several cycles, as indicated by boxes 114 and 116 in FIG. 6. For example at time $t > t_4$ the second iterative cycle will begin. Note that the input logic $G_{INi}$ passes only the first cycle of the CLK signal to the Enable input of the input register $R_{INi}$. As a result, no new values are loaded into the input register $R_{INi}$ at the beginning of iterative cycles after the first cycle. Each input buffer that has already had a request granted is inactive during subsequent cycles, and its input register $R_{INi}$ stores data representing a request at the corresponding input port that was granted and selected.

In each input buffer that has not already had a request granted, the input register $R_{INi}$ continues to store the request vector that was loaded therein at time $t_2$. As was described with reference to the first iterative cycle, each such input unit's access requests are communicated synchronously and in parallel to all output units. Those output units that, in previous iterative cycles, granted a request that was accepted (i.e., selected) by the corresponding output unit are inactive because the output logic $G_{OUTj}$ outputs a "1", which recycles the previous grant signal from the output register $R_{OUTj}$ back through the output multiplexer $M_{OUTj}$.

For output units that did not issue a grant that was selected on a previous iterative cycle, the associated output multiplexer select ("S") input will be "0". As a result, the grant selection by the associated output choice unit $C_{OUTj}$ passes through the associated output multiplexer (since the choice is presented on the now operative "0" input on the multiplexer). For such output units, the operation of the present invention is the same as was described earlier with respect to output unit 3.

Again as was described with reference to the first iterative cycle, the input units receive access grants and each input choice unit selects, at time $t > t_5$, precisely one of these grants. After a second iterative cycle has been completed at time $t_6$, on the average 75% of the access requests that were not satisfied on the first iteration will now have been satisfied. Additional iterations are made and preferably after a relatively small number of such iterations (e.g., four cycles) the process is halted.

The next task is to transmit cells corresponding to granted requests from the input buffers through the switch 22. The request grant signals stored in the output registers $R_{OUTj}$ are transmitted to the switch 22 so as to make the associated crossbar connections. For instance, the $R_{OUTj}$ could be used to control a set of corresponding multiplexers, each having its output coupled to one of the switch's output ports. Similarly, the accepted grant signals stored in the input registers $R_{INi}$ are transmitted to the input buffers so as to select which cell to transmit. In the preferred embodiment, the selections made by the arbitration apparatus during one data transmission cycle are used by the switch 22 during the next data transmission cycle.

After the selections made by the arbitration apparatus are sent to the switch 22, the arbitration process beings anew, but with new data input to each input buffer $B_i$ (see box 114 in FIG. 6). Control logic 37 (see FIG. 3) controls the process of loading new data into each input buffer and for resetting the arbitration mechanism after a predetermined number of iterative cycles. In the preferred embodiment, the number of iterative cycles is four and, generally, it is preferred that the number of iterative cycles be five or less. When the maximum number of possible matches N between requesters and servers is large (e.g., greater than 64), the preferred maximum number of iterative cycles is the logarithm, base 4, of N, rounded up to the closest integer plus 2: $[Log_4 N + 2]$ (which is biased on the fact that 75% of all possible matches are achieved, average, during each iterative cycle).

To recapitulate, an arbitration method according to the present invention includes the following steps:

(1) The arbitration mechanism is initialized (FIG. 6, box 100);

(2) Input information for each requester is synchronous loaded in parallel with input information for each other requester, the information representing a set of access requests to servers (FIG. 6, box 102);

(3) Each unmatched requester synchronously and in parallel sends an access request to all servers to which access is sought by a member of the set of access requests associated with each requester. This step (FIG. 6, box 104) notifies each server as to all potential requesters seeking a connection;

(4) If an unmatched server receives any requests, it chooses precisely one request to grant, the choice preferably being random or pseudo-random (FIG. 6, box 106).

(5) Synchronously and in parallel, each server then notifies each requester whether its access request was granted (FIG. 6, box 108).

(6) If a requester receives any grants, it chooses one grant to accept (FIG. 6, box 110), and thereafter asserts only the corresponding request on its request transmission lines. This selection need not be random or pseudo-random. Preferably servers continue to assert an access grant as long as a request for access continues to be asserted by a server (FIG. 6, box 110).

(7) After a first iterative cycle as defined by steps (2)-(6), a number of matches will have been made between requesters and servers. As to unsatisfied requests, the iteration is repeated for a predetermined number of cycles.

(8) After a predetermined number of cycles, a substantial number of requests will have been matched with servers. Signals representing the matched requesters and servers are sent to the switching mechanism for forwarding the corresponding cells to their respective output ports. Then request Steps (1) and (2) are repeated, causing new sets of access requests to be presented, whereupon steps (3)-(8) are repeated. (FIG. 6, box 114).

Computer simulation demonstrates that the above-described parallel iterative matching scheme converges relatively rapidly and that on average, approximately 75% of the maximum possible number of matches are made on each cycle. If N=16, and each requester seeks access to at least one server, and furthermore all servers receive at least one request, on average, during the first iterative cycle 75% × 16 or 12 of the maximum possible 16 requester-server matches will be made. On average, during the second cycle, 75% × 4 or 3 additional requesters will be matched with servers, leaving but one requester out of the original 16 to be matched on the third cycle. Note, however, that if sixteen requesters seek access to at least one server, but only five of the servers receive requests because many of the requests are to the same servers, a maximum of five requester-server matches are possible, and each iterative cycle will, on average, achieve 75% of the remaining possible requester-server matches. Within a relatively few clock cycles, the present invention can achieve a maximal match substantially more quickly than if a conventional sequential approach were employed.

Because each requester can be coupled to at most one server, and each server to at most one requester, parallelism may be employed, whereby all requesters and servers may be coupled to each other. As a result, all the requester's requests are considered by the servers simultaneously and made available for matching to some as yet unmatched server for which the requester seeks access or service. On the server side, by selecting one access grant (preferably randomly or at least pseudo-randomly), server choices are de-synchronized such that each server frequently grants to a requester that no other server has selected for grant. Doing so promotes good performance and allows a proof that on average, applicant's algorithm takes $O(\log N)$ iterations to reach a maximal match, where "O" denotes order of magnitude. This average holds true independent of the pattern of access requests. An intuitive "proof" of convergence is indicated as follows.

To show that each cycle of the iterative matching process causes, on average, at least 75% of requests to be removed from further consideration (i.e., either satisfied by a match or eliminated by the granting of a competing request), consider the requests directed to a single output unit Q. At the beginning of the first match cycle, n requests are presented to that output unit, where n is less than or equal to the number of input ports.

The assumption that output unit Q chooses a request to grant randomly from among the requests presented to ft allows us to equate the probability that a request with some particular property will be selected by output unit Q with the fraction of the requests that have the given property. The property we will use is the fraction of the input units that request output unit Q. By definition, a is the probability that output unit Q will grant the request of an input unit and that the input unit will receive no other grants. Since such input units receive no other grants, they choose to accept the grants from output unit Q. In doing so, they remove from further consideration all the n requests that were directed to output unit Q. Thus, on average, a × n requests from the "single grant input units" are removed from further consideration each iterative cycle.

Output unit Q grants to inputs that receive other grants with probability (1−a). Even if output unit Q's grant is not accepted, the associated n × (1−a) input units will choose some grant, and therefore their requests to Q will not be made in the next iterative cycle. Thus, on average, n × (1−a)(1−a) requests from the "multiple grant input units" are removed from further consideration each iterative cycle.

The total number of requests removed per iterative cycle, on average, is the sum of these two contributions:

$$a*n+n*(1-a)(1-a)=n*(a+(1-a)^2)=n*(1-a+a^2)$$

The expression $(1-a+a^2)$ is a quadratic function that has a minimum value of 0.75 (at $a=0.5$) for all values of a (which is a probability value) between 0 and 1. This means that, on average, at least 0.75n requests are removed from further consideration each cycle.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. For instance, R will be appreciated that the present invention may be practiced with any system wherein a set of access requests is to be rapidly matched to a set of system resources.

What is claimed is:

1. A method of arbitrating requests by a plurality of requesters to a plurality of servers, the method comprising:
    (a) receiving requests from each of said plurality of requesters, said requests received from each requester comprising a set of requests for access to specified ones of said servers, wherein the set of requests received from at least one of said requesters includes a plurality of simultaneous requests for access to a corresponding plurality of servers;
    (b) simultaneously communicating each received request to each server to which access is requested;
    (c) simultaneously, for each requested server, issuing a grant to a selected one of said requests for access to said server;
    (d) simultaneously communicating to respective ones of said plurality of requesters each said issued grant of a request in said respective requester's set of requests;
    (e) simultaneously accepting, by each requester whose set of requests includes at least one request for access that has been issued a grant, one said grant;
    (f) repeating steps (b) through (e) for a predetermined number of iterations, excluding each requester which has already accepted one said grant and excluding each server whose grant was accepted by a requester; wherein said predetermined number of iterations is at least two iterations; and
    (g) simultaneously granting, to each request for which a grant was issued and accepted, access to the server whose grant was accepted.

2. The method of claim 1, wherein no access priority exists among said requests for access to each server and in said step (c) each server randomly selects for grant from among said requests for access to said each server.

3. The method of claim 1, wherein no access priority exists among said requests for access to each server and in said step (c) each server pseudo-randomly selects for grant from among said requests for access to said each server.

4. The method of claim 1, wherein each server is indifferent as to which requester it satisfies.

5. The method of claim 1, wherein each said set of requests includes a plurality of cells, each cell bearing an identification number that designates a server to which said cell requests access.

6. The method of claim 1, wherein said predetermined number of iterations is five or less.

7. An arbitration apparatus for requests by a plurality of requesters to a plurality of servers, the arbitration apparatus comprising:
    request receiving means for receiving requests from each of said plurality of requesters, said requests received from each requester comprising a set of requests for access to specified ones of said plurality of servers, wherein the set of requests received from at least one of said requesters includes a plurality of simultaneous requests for access to a corresponding plurality of servers;
    requested communication means for simultaneously communicating all received requests for access to each server to which access is requested;
    a plurality of server means, corresponding to said plurality of servers, for simultaneously issuing a respective grant to a selected one of said requests for access to each respective one of said plurality of servers;
    grant communication means for simultaneously communicating to respective ones of said plurality of requesters each said issued grant of a request in said respective requester's set of requests; and
    a plurality of requester means, corresponding to said plurality of requesters, for simultaneously accepting, on behalf of each respective requester whose set of requests includes at least one request for access that has been issued a grant, one said grant.

8. The arbitration apparatus of claim 7, further including iteration control means for repeating enabling operation of said plurality of server means and said plurality of requester means a predetermined number of iterative cycles wherein said predetermined number of iterative cycles is at least two iterative cycles;
    each server means including means for continuing to issue a previously issued grant if said previously issued grant was accepted by one of said plurality of requester means, and each requester means including means for continuing to accept a previously accepted grant if said requester means previously received at least one issued grant.

9. The arbitration apparatus of claim 8, wherein said predetermined number of iterative cycles is five or less.

10. The arbitration apparatus of claim 7, wherein each server means randomly selects for grant from among said requests for access to said each server.

11. The arbitration apparatus of claim 7, wherein each server means pseudo-randomly selects for grant from among said requests for access to said each server.

12. The arbitration apparatus of claim 7, wherein each server means is indifferent as to which requests it satisfies.

13. The arbitration apparatus of claim 7, wherein each said set of requests includes a plurality of cells, each cell bearing an identification number that designates a server to which said cell requests access.

14. A method of arbitrating requests by a plurality of requesters to a plurality of servers, the method comprising:
    (a) receiving requests from each of said plurality of requesters, said requests received from each requester comprising a set of requests for access to specified ones of said plurality of servers, wherein the set of requests received from at least one of said requesters includes a plurality of requests for access to a corresponding plurality of servers;

(b) communicating each received request to each server to which access is requested;

(c) for each requested server, issuing a grant to a selected one of said requests for access to said server;

(d) communicating to respective ones of said plurality of requesters each said issued grant of a request in said respective requester's set of requests;

(e) accepting, by each requester whose set of requests includes at least one request for access that has been issued a grant, one said grant;

(f) repeating steps (b) through (e) for a predetermined number of iterations, excluding each requester which has already accepted one said grant and excluding each server whose grant was accepted by a requester; wherein said predetermined number of iterations is at least two iterations; and (g) granting, to each request for which a grant was issued and accepted, access to the server whose grant was accepted.

15. The method of claim 14, wherein no access priority exists among said requests for access to each server and in said step (c) each server randomly selects for grant from among said requests for access to said each server.

16. The method of claim 14, wherein no access priority exists among said requests for access to each server and in said step (c) each server pseudo-randomly selects for grant from among said requests for access to said each server.

17. An arbitration apparatus for requests by a plurality of requesters to a plurality of servers, the arbitration apparatus comprising:

request receiving means for receiving requests from each of said plurality of requesters, said requests received from each requester comprising a set of requests for access to specified ones of said plurality of servers, wherein the set of requests received from at least one of said requesters includes a plurality of requests for access to a corresponding plurality of servers;

request communication means for communicating all received requests for access to each server to which access is requested;

a plurality of server means, corresponding to said plurality of servers, for issuing a respective grant to a selected one of said requests for access to each respective one of said plurality of servers;

grant communication means for communicating to respective ones of said plurality of requesters each said issued grant of a request in said respective requester's set of requests; and a plurality of requester means, corresponding to said plurality of requesters, for accepting, on behalf of each respective requester whose set of requests includes at least one request for access that has been issued a grant, one said grant.

18. The arbitration apparatus of claim 17, further including iteration control means for repeating enabling operation of said plurality of server means and said plurality of requester means a predetermined number of iterative cycles wherein said predetermined number of iterative cycles is at least two iterative cycles;

each server means including means for continuing to issue a previously issued grant if said previously issued grant was accepted by one of said plurality of requester means, and each requester means including means for continuing to accept a previously accepted grant if said requester means previously received at least one issued grant.

19. The arbitration apparatus of claim 17, wherein each server means randomly selects for grant from among said requests for access to said each server.

20. The arbitration apparatus of claim 17, wherein each server means pseudo-randomly selects for grant from among said requests for access to said each server.

21. An arbitration apparatus, comprising:

N output ports, where N is an integer greater than two;

a plurality of input ports for receiving requests, said requests received by each input port comprising a set of requests for access to specified ones of said N output ports, wherein the set of requests received by at least one of said input ports includes a plurality of requests for access to a corresponding plurality of said N output ports;

request communication circuitry, coupled to said plurality of input ports, for communication all received requests for access to each server to which access is requested;

N request arbiters, each corresponding to one of said N output ports, for issuing a respective grant to a selected one of said requests for access to each respective one of said N output ports;

grant communication circuitry, coupled between said N request arbiters and said plurality of input ports, for communicating to respective ones of said plurality of input ports each said issued grant of a request in said respective input port's set of requests;

a plurality of grant acceptance circuits, coupled to corresponding ones of said plurality of input ports and to said grant communication circuitry, for accepting, on behalf of each respective input port whose set of requests includes at least one request for access that has been issued a grant, one said grant; and iteration control means for repeatedly enabling operation of said N request arbiters and said plurality of grant acceptance circuits for a predetermined number of iterative cycles wherein said predetermined number of iterative cycles is at least two iterative cycles.

22. The arbitration apparatus of claim 21,
wherein each grant acceptance circuit includes means for retaining a grant accepted during one said iterative cycle through later ones of said iterative cycles, and each request arbiter includes means for preventing issuance of grant to an additional selected one of said requests for access to said respective one of said N output ports after a grant issued by said each request arbiter has been accepted by one of said plurality of grant acceptance circuits.

23. The arbitration apparatus of claim 22, wherein said predetermined number of iterative cycles is five or less.

24. The arbitration apparatus of claim 22, wherein each request arbiter randomly selects for grant from among said requests for access to said each output port.

25. The arbitration apparatus of claim 22, wherein each request arbiter pseudo-randomly selects for grant from among said requests for access to said each output port.

26. The arbitration apparatus of claim 22, wherein each said set of requests includes a plurality of cells, each cell bearing an identification number that designates one of said N output ports to which said cell requests access.

* * * * *

UNITED STATES PATENT AND TRADEMARK OFFICE
CERTIFICATE OF CORRECTION

PATENT NO.    : 5,267,235
DATED         : November 30, 1993
INVENTOR(S)   : Charles P. Thacker It is certified that error appears in the above-identified patent and that said Letters Patent is hereby corrected as shown below:

Column 16,
Line 53, delete "requests" and insert therefor -- requester --.

Signed and Sealed this

Sixteenth Day of August, 2005

JON W. DUDAS
*Director of the United States Patent and Trademark Office*